United States Patent [19]

Dwyer, Jr. et al.

[11] Patent Number: 5,027,208
[45] Date of Patent: Jun. 25, 1991

[54] THERAPEUTIC SUBLIMINAL IMAGING SYSTEM

[75] Inventors: Joseph J. Dwyer, Jr.; Loy R. White, both of Newton, N.H.; Matthew K. Haggerty, Medford; John A. Purbrick, Arlington, both of Mass.

[73] Assignee: Sub-Tv Limited Partnership, Newton Junction, N.H.

[21] Appl. No.: 464,906

[22] Filed: Jan. 16, 1990

Related U.S. Application Data

[63] Continuation-in-part of Ser. No. 260,738, Oct. 21, 1988, abandoned.

[51] Int. Cl.⁵ .............................................. H04W 5/04
[52] U.S. Cl. ................................... 358/148; 358/149; 358/142; 358/183
[58] Field of Search ............... 358/148, 158, 149, 142, 358/183

[56] References Cited

U.S. PATENT DOCUMENTS

| | | | |
|---|---|---|---|
| 3,278,676 | 10/1966 | Becker | 358/142 |
| 4,346,407 | 8/1982 | Bear et al. | 358/149 |
| 4,425,581 | 1/1984 | Schweppe et al. | 358/148 |
| 4,864,401 | 9/1989 | Kawata et al. | 358/148 |

Primary Examiner—Howard W. Britton
Assistant Examiner—David E. Harvey
Attorney, Agent, or Firm—Hamilton, Brook, Smith & Reynolds

[57] ABSTRACT

A therapeutic subliminal imaging system wherein a selected subliminal message is synchronized with and added to an existing video signal containing a supraliminal message. A television receiver or video recorder can be used to provide the supraliminal message and a video processing circuit varies the intensity of that perceptible message to incorporate one or more subliminal images.

16 Claims, 3 Drawing Sheets

THERAPEUTIC SUBLIMINAL IMAGING SYSTEM

BACKGROUND OF THE INVENTION

This is a Continuation-In-Part of U.S. patent application Ser. No. 07/260,738 filed Oct. 21, 1988, which is incorporated herein by reference now abandoned.

The present invention relates to systems for generating subliminal messages synchronously added to selected supraliminal messages where the combined image is displayed for the purpose of therapeutically influencing behavior.

The behavior of individuals may be influenced by visual messages generated at intensity or duration levels sufficiently low that they are not consciously perceived. A variety of systems have been developed to display a supraliminally perceptible visual image having a subliminally perceptible message presented in conjunction therewith. These systems typically use motion picture or television systems for displaying conventional programs along with a therapeutic message that is not consciously perceptible by a human observer but is capable of influencing the subconscious mind of the observer in such a way as to influence behavior.

The systems typically involve arrangements wherein both the source of the supraliminal video signal and subliminal video signal are under the control of the system's operator. In a motion picture version, a pair of separate motion picture projectors employ a mechanism connecting them so that they operate in synchrony to generate the supraliminal program signal along with the superimposed subliminal message. Alternatively, pairs of television cameras have been used to separately generate two signals which are synchronized to provide a combined signal suitable for use with a television receiver.

The apparatus required for most existing systems has severely limited their application. However, some subliminal message systems have utilized readily available equipment and conventionally broadcast programs for the supraliminal program source and simply switch to a subliminal signal at short intervals to impress the observer with a subliminal message that might direct the observer to undertake desirable action.

SUMMARY OF THE INVENTION

The invention relates to portable systems for implementing behavior modification therapy wherein a subliminal message is added to a preexisting supraliminal message and the combined image is displayed on a video screen.

A television receiver or video recorder can be used to provide the supraliminal message. The desired subliminal message or image is provided by a preprogrammed chip that is inserted by the user into a compact video processing circuit that combines the two signals for viewing.

The video processing system of a preferred embodiment of the invention synchronizes the video signal containing the supraliminal message with a signal containing the desired subliminal message. The system then either lightens or darkens portions of the supraliminal message, in a manner that is not consciously perceptible to the viewer, to present the subliminal message. Thus an optical characteristic of a portion of the supraliminal message is altered slightly to incorporate the subliminal message.

This embodiment utilizes an analog oscillator in conjunction with a digital circuit to synchronize the subliminal message signal with the existing video signal. A video synchronization detector circuit receives the supraliminal video signal and generates digital outputs that mark the beginning of each vertical and horizontal line within the two dimensional image. These vertical and horizontal synchronization signals are used to instruct a microprocessor, which accesses a digital memory in which the subliminal message has been stored, to deliver the contents of each line of the subliminal message for addition to the appropriate line of the supraliminal image. An analog oscillator is used rather than a crystal clock because it can be stopped by a composite synchronization pulse and re-started, thereby starting each line at exactly the same time interval following the synchronization pulse. This results in improved stability of the subliminal message relative to the supraliminal message during one scan of the screen and between successive scans.

A monostable ("one shot") multivibrator is gated by the microprocessor to produce pulses so that only selected portions of each supraliminal image are altered to incorporate the subliminal message. The oscillator is controlled directly by the one-shot's output and is stopped only for the duration of the one-shot pulse.

A counter is used to control delivery of the subliminal message for each screen line. The counter does not depend on the stopping of the oscillator to control counting. Rather, the counter disables itself after counting the pixels on each line of the subliminal image and allows the oscillator to run. The one-shot is used to both stop the oscillator and zero the counter. This video mixer thus uses a simple control circuit to provide placement of the subliminal message anywhere on the supraliminal image. The system avoids the use of noisy analog differentiation circuits to provide pulse signals which control circuit operation.

The above, and other features of the invention, including various novel details of construction and combination of parts, will now be more particularly described with reference to the accompanying drawings and pointed out in the claims. It will be understood that the particular therapeutic subliminal imaging system embodying the invention is shown by way of illustration only and not as a limitation of the invention. The principle features of this invention may be employed in various embodiments without departing from the scope of the invention.

DETAILED DESCRIPTION

A preferred embodiment of the invention is a device for implementing behavior modification therapy in either a clinical or home setting. The types of behavior being treated include, but are not limited to, self-destructive habits and addictions such as over-eating, smoking, alcohol and drug dependencies. The system can also be employed for the presentation of performance enhancing, or stress reducing messages useful in a wide variety of applications.

The method employed involves the presentation of a subliminal message imposed on an existing television picture or program. The system can consist of a TV tuner, which the user would set to any desired channel, or alternatively, a video recorder to provide a video signal directly. The system further comprises a video processing circuit housed in a compact unit that would provide the subliminal signal and then pass a video signal, with the added subliminal message, to a television monitor for viewing.

Subliminal stimulation is the presentation of information to a subject at a level so low that it cannot consciously be perceived. Nevertheless, there is a range of stimulus levels in which it can be demonstrated that the subject perceived the information, but without being conscious of that perception. The simultaneous presentation of a consciously perceptible image or sequence of images such as a normal television picture serves to attract the attention of the subject receiving treatment. The method used here is to add, or overlay, a textual, or graphic message with a TV picture. The message is displayed simultaneously with the normal picture, as opposed to replacing it. This differs from much of the clinical work in the field, where a message is presented "tachistoscopically", i.e. as a brief flash replacing the supraliminal program.

The therapeutic message can be constant, or may change at intervals, presenting a series of sentences or images. In one embodiment the screen has 256 successive lines at 256 pixels per line to display a given sentence or image, however, any suitable grid configuration can be used depending upon the desired method of implementation.

Figure 1:
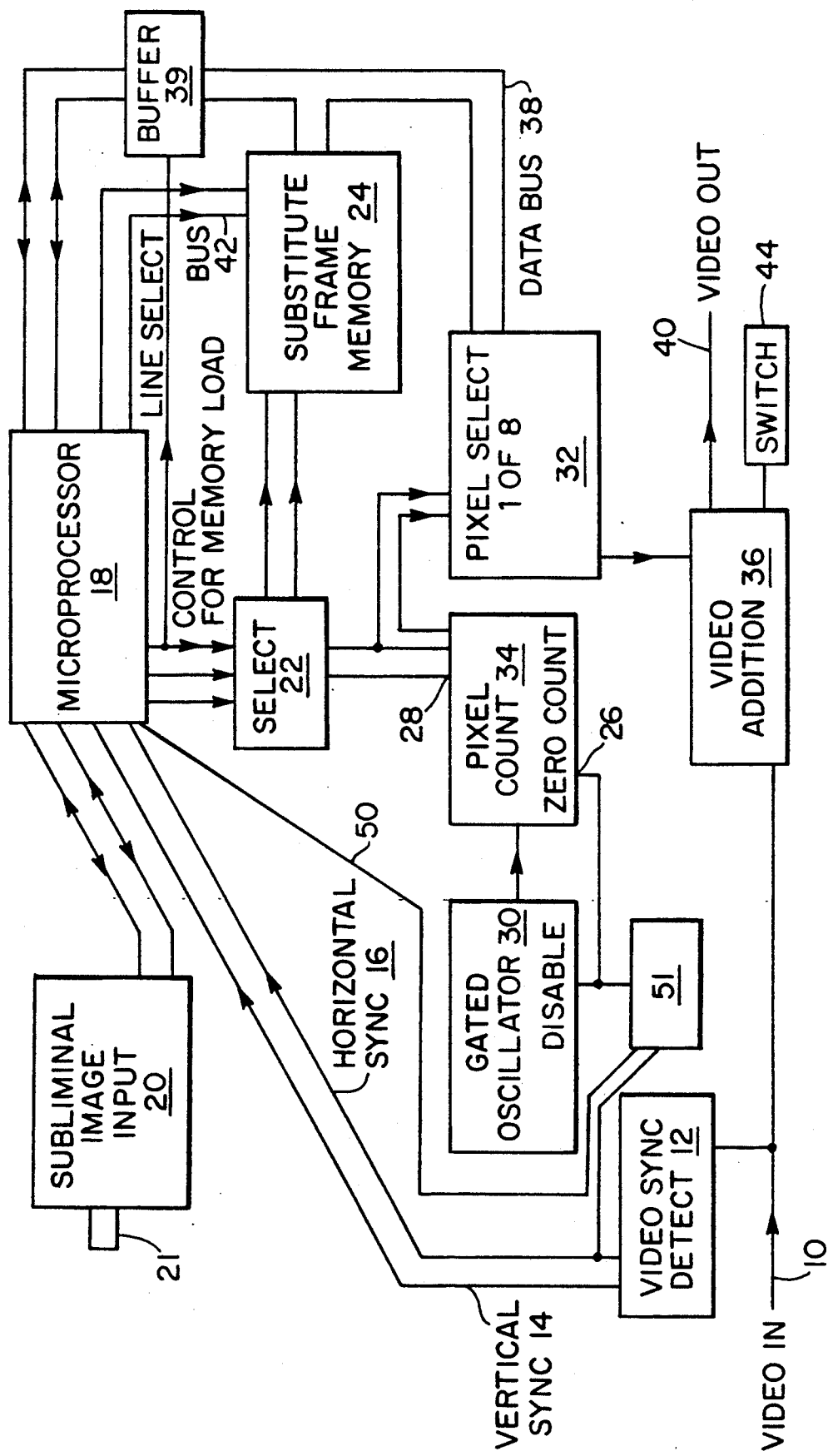
FIG. 1 is a schematic diagram of the processing circuit for a preferred embodiment of the invention.

A schematic diagram of a preferred embodiment of the processing system of the present invention is shown in FIG. 1. In order to present the subliminal message at a constant location on the screen, it is important to synchronize the signal bearing the message with the incoming video signal 10. A microprocessor-based system does this as follows: A video synchronization (sync) detection circuit 12 reads the incoming video signal 10 and provides digital outputs for both vertical 14 and horizontal 16 synchronization signals. Each of these signals interrupts a microprocessor 18 and instructs it to transmit information previously input to substitute frame memory 24, to video mixer 36.

A computer can be employed to initially input the desired subliminal message into the memory 24. However, in most applications a preprogrammed ROM (read-only-memory) chip 21 containing the desired subliminal message is accessed by the microprocessor 18 through an input circuit 20. Thus, different messages can be supplied independently after installation of the system shown in FIG. 1 merely by providing additional, suitably packaged, preprogrammed ROM chips. The chips can be packaged as cartridges, for example, that could be individually programmed and provided separately.

Vertical sync 14 is the "master reset" indicating the start of a particular frame. When it occurs, a timer is started which runs for approximately 1 millisecond. This is a start-of-frame delay which is designed to end when the correct starting point for the therapeutic message occurs. The therapeutic message is sent out as 256 successive lines with 256 pixels per line. Following the start-of-frame delay, every horizontal sync pulse 16 interrupts the processor 18, which sets the correct line number onto the "line select" bus 42. This gives the frame memory 24 the top 8 bits of the memory address from which the subliminal image is retrieved. Eight bits are sufficient to designate one of the image's 256 lines. The selection of 1 byte from among the 32 bytes in each line of the image is done by another method.

The remaining 5 address bits which are sufficient to select among the 32 bytes of the line being displayed are normally generated by a free-running oscillator-counter arrangement that is used to trigger the pixel counter 34 to synchronize the supraliminal component with the subliminal component. A pixel counter 34 is zeroed at the start of each line when a horizontal sync pulse 16 is generated.

More specifically, the processor 18, via active-area line 50, can allow or prevent the operation of a one-shot 51. Since only enough data are stored to fill 256 screen lines, while a television screen has a considerably larger number of lines, the start-of-frame delay mentioned above is used to cause the system to wait for the correct starting point of the therapeutic message. At this time, the "active area" line is asserted, allowing pulses to be produced by one-shot 51. When a horizontal sync pulse 16 occurs after this, it triggers one-shot 51, which has the dual effects of zeroing pixel counter 34 and stopping oscillator 30. The one-shot's 51 pulse length is such that it ends at the correct point in the horizontal sweep time for the start of the therapeutic message. At the end of the pulse, the oscillator 30 starts in an identical manner for each line: it will thus operate repeatably during the sweep time for any line on the screen. The counter 34 meanwhile, starts from a count of zero and counts pixels until it reaches the last pixel of the therapeutic message's display (preferably 256 pixels per line), at which point the counter disables itself while oscillator 30 continues to run. The frequency of oscillator 30 is selected so that 256 counts occur in the time taken for display of one screen line of the therapeutic message.

An analog oscillator 30, rather than a crystal clock, is used because it can be stopped by the sync pulse and re-started, thus starting each line at exactly the same time interval following the sync pulse. The accuracy of the oscillator 30 is of only slight importance, the vital factor being the clock's short term stability, in order to present a stationary image forming the subliminal message.

Figure 3:
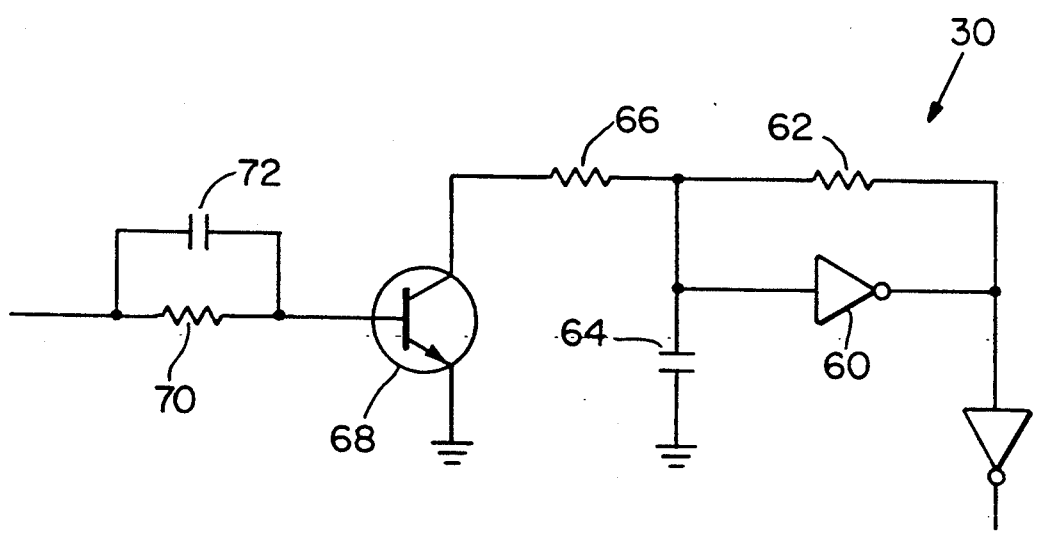

Oscillator 30 is shown in greater detail in FIG. 3 and operates as follows: Schmitt-trigger inverter 60 performs the oscillator function by means of feedback from output to input via 62. Current from the output causes charge to be added to or removed from capacitor 64 until the voltage at the inverter's input pin reaches a threshold level; at this point, the output of the gate will switch to a logic "low" level if the "high" threshold level is reached, or to "high" for the "low" threshold level. Since the Schmitt-trigger characteristic of the gate causes the "high" threshold to be higher than the "low threshold, there will need to be an appreciable change in the input level between, for example, a high-going output change and a low-going change. In the case of oscillator 30, this requirement for voltage change causes a delay while charge accumulates on 64 (if the output of 60 is high) or while charge is removed therefrom if the output is low. The values of 64 and 66 thus set the frequency of oscillator 30.

In order to stop the oscillator, transistor 68 is turned on by current flow into its base via 70 with an additional current pulse via 72 contributing to rapid turn-on. This causes current to sink through 66 to ground, the result of which is a voltage divider formed by 62 and 66. The voltage at the input pin of 60 is now too low to be considered a logic "high", and thus the output of the inverter will be "high". This condition continues as long as 68 is turned on. When 68 turns off, charge can again accumulate in 64. It would be possible to stop the oscillator without resistor 66, in which case 64 and the input pin of 60 would be pulled essentially to ground by 68, but the time taken to restart the oscillator would be greater in this case on account of the time taken to recharge 64 from the lower voltage level.

The pixel counter 34 delivers 5 bits via select 22, to address a byte from the frame memory 24 for display, and an additional 3 bits to select among the byte's 8 bits. The pixel select 32 transmits the selected bit, delivered from frame memory 24 via data bus 38, for subsequent addition to the video signal.

A video mixer or addition circuit 36 then adds the selected bit, constituting a portion of the subliminal signal, conveyed from the frame memory 24 to the pixel select 32 via bus 38, to the existing video signal 10 containing the supraliminal component of the final composite video signal. An increase of voltage on the video output 40 will cause a slight lightening of the image, and a decrease will darken it. This change in the intensity can be accomplished by the digital subliminal signal in response to a bit of value 1, while 0 would leave the image unchanged.

To present a succession of different messages, the frame memory 24 must be reloaded with new data at a selected update rate. This is done by the processor 18 switching the memory address selector 22 to give it direct control of the 5 bits otherwise provided by pixel counter 34. Note that the 8-bit line selection bus 42 is always under the processor's control. This allows the processor 18 to load as much of the frame memory 24 as needed, or to read it back for verification. When the frame memory 24 is being loaded or verified, an additional buffer 39 allows processor 18 to send data onto the bus 38 or receive data from it. Buffer 39 is normally inactive thereby isolating the bus 38 from the microprocessor 18 during presentation of the composite subliminal/supraliminal video signal. Normally it is not desirable to enable the screen showing the video output 40 to display stored data at the same time as the frame memory 24 is being loaded by the processor 18. To prevent the screen from displaying a disrupted image, the output of the system of FIG. 1 is blanked and the video in signal 10 passes unaffected through to video output 40, while the memory is reloading, although this refinement may not be strictly necessary in the case of subliminal images. The video output 40 may be controlled by switch 44 to select for display either the supraliminal image, the subliminal image, or the combined image.

Figure 2:
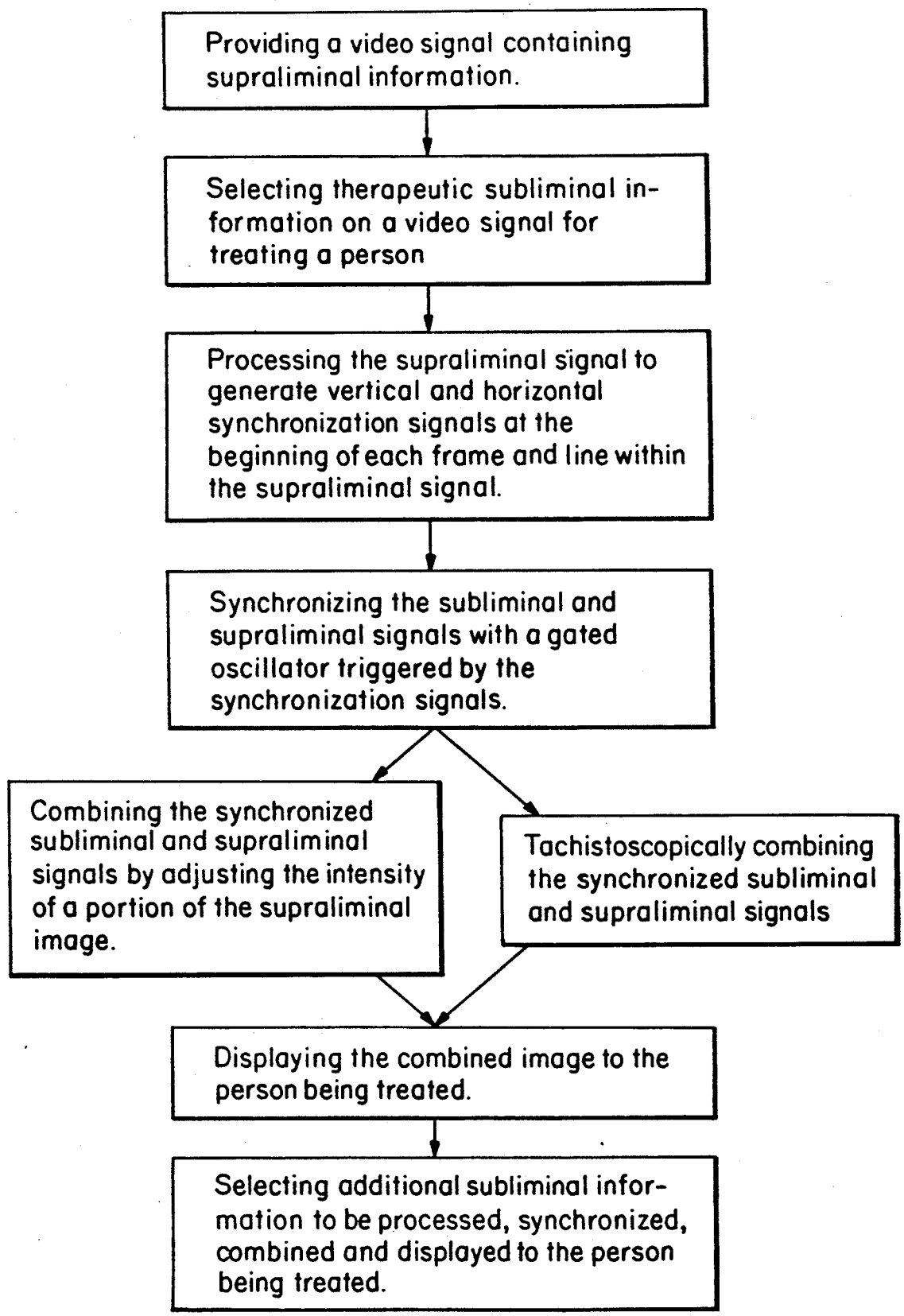
FIG. 2 is a process flow diagram illustrating a method of subliminal therapy embodying the invention.

FIG. 2 illustrates in the form of a process flow diagram the method employed in performing the rehabilitative or performance enhancement therapy of the present invention. An existing video program containing supraliminal information is input into a processing circuit such as that shown in FIG. 1. Vertical and horizontal synchronization signals contained in the existing supraliminal video program are identified by the circuit to synchronize the transfer of each line of a second video signal provided by a ROM chip 21 with each line of each frame of the supraliminal signal. The second video signal contains selected subliminal information to be added to the supraliminal signal. A gated analog oscillator within the circuit is triggered by the synchronization signals such that each line within a frame of the supraliminal video signal occurs at a constant time interval after each synchronization signal.

Each line of each frame of the subliminal signal stored in the frame memory 24 is then added to each line of each frame of the supraliminal signal such that the intensity of a portion of the supraliminal signal is altered. The resulting image is then displayed on a television monitor for viewing by the person seeking treatment, behavior modification or performance enhancement.

A further method for presenting the subliminal message provides for the tachistoscopic addition of the subliminal message with the continuously presented supraliminal message. This differs from prior art methods of tachistoscopic presentation where the supraliminal message is interrupted during presentation of the subliminal message. The present method utilizes the periodic addition of the subliminal signal to the continuously presented supraliminal signal.

The above system provides a compact unit that is readily used with existing television equipment in both home and office environments. The user need only connect the output 40 to a television, select the cartridge containing the desired subliminal message and insert it into the unit.

We claim:

1. A video processing system for generating a subliminal visual message comprising:
   a synchronization detector to receive a video signal having a supraliminal image and to provide a synchronization signal;
   a one-shot multivibrator triggered by the synchronization signal to produce a pulse signal of selected duration;
   a gated oscillator that is stopped by the multivibrator pulse signal for the duration of the pulse signal;
   a microprocessor to transmit a subliminal image synchronized with the video signal by the gated oscillator; and
   a video mixer to combine the supraliminal image with the subliminal image.

2. The video processing system of claim 1 wherein said oscillator is comprised of an analog oscillator.

3. The video processing system of claim 1 wherein said mixer alters an optical characteristic of the supraliminal image to generate the subliminal image.

4. The video processing system of claim 3 wherein the optical characteristic is comprised of the intensity of the supraliminal image.

5. The video processing system of claim 1 wherein said synchronization signal is comprised of vertical and horizontal synchronization signals.

6. The video processing system of claim 1 further comprising a video switch to select the supraliminal image, the subliminal image, or the combined image.

7. The video processing system of claim 1 wherein the gated oscillator synchronizes the subliminal image such that each line within a frame of the subliminal image occurs at a constant time interval after each synchronization signal.

8. A method of performing therapy utilizing subliminal images comprising:
   providing a first video signal containing supraliminal information;
   providing a second video signal containing subliminal information;
   generating a synchronization signal from the first video signal;

triggering a one-shot multivibrator with the synchronization signal to produce a pulse signal of selected duration;

synchronizing the first video signal with the second video signal with a gated oscillator that is stopped by the multivibrator for the duration of the pulse signal; and combining the subliminal information with the supraliminal information by altering an optical characteristic of a portion of an image formed from the supraliminal information.

9. The method of performing therapy of claim 8 wherein said synchronizing step further comprises generating vertical and horizontal synchronization signals from the first video signal, and triggering the gated oscillator with the pulse signal such that each line within a frame of the subliminal video signal triggers the start of each line within a frame of the second video signal at a constant time interval after each synchronization signal.

10. The method of performing therapy of claim 8 wherein the optical characteristic comprises intensity.

11. The method of performing therapy of claim 8 further comprising displaying the combined information to treat a person.

12. The method of performing therapy of claim 8 further comprising combining additional subliminal information with the supraliminal information.

13. The method of performing therapy of claim 8 wherein said combining step further comprises the tachistoscopic addition of the subliminal information with continuously presented supraliminal information.

14. A video processing system to provide subliminal images comprising:

a first video input circuit to provide a video signal having a supraliminal image;

a second video input circuit to receive a recorded video signal having a subliminal image;

a synchronization circuit to synchronize the supraliminal image with the subliminal image, the circuit comprising a synchronization detector to generate vertical and horizontal synchronization signals, a microprocessor responsive to the synchronization signals to transmit the subliminal image into a memory, a one-shot multivibrator that generates a pulse in response to the horizontal synchronization signal and an oscillator that is controlled by the multivibrator pulse such that the image in the memory is synchronized with the suproliminal video signal;

a video mixer to alter an optical characteristic of the supraliminal image to add the subliminal image thereto; and a video screen to display the added supraliminal and subliminal images.

15. The video processing system of claim 14 wherein said subliminal image is recorded on read-only-memory (ROM) circuit.

16. The video processing system of claim 15 wherein said ROM circuit comprises a cartridge that is removable from the system.

* * * * *